Nov. 11, 1947.  W. F. PECK ET AL  2,430,779
ATTACHMENT MEANS FOR BINOCULAR PRISMS AND THE LIKE
Filed March 22, 1944  2 Sheets-Sheet 1

INVENTOR.
KENNARD W. HARPER.
WILLIAM F. PECK.
BY Raymond A. Paquin
ATTORNEY

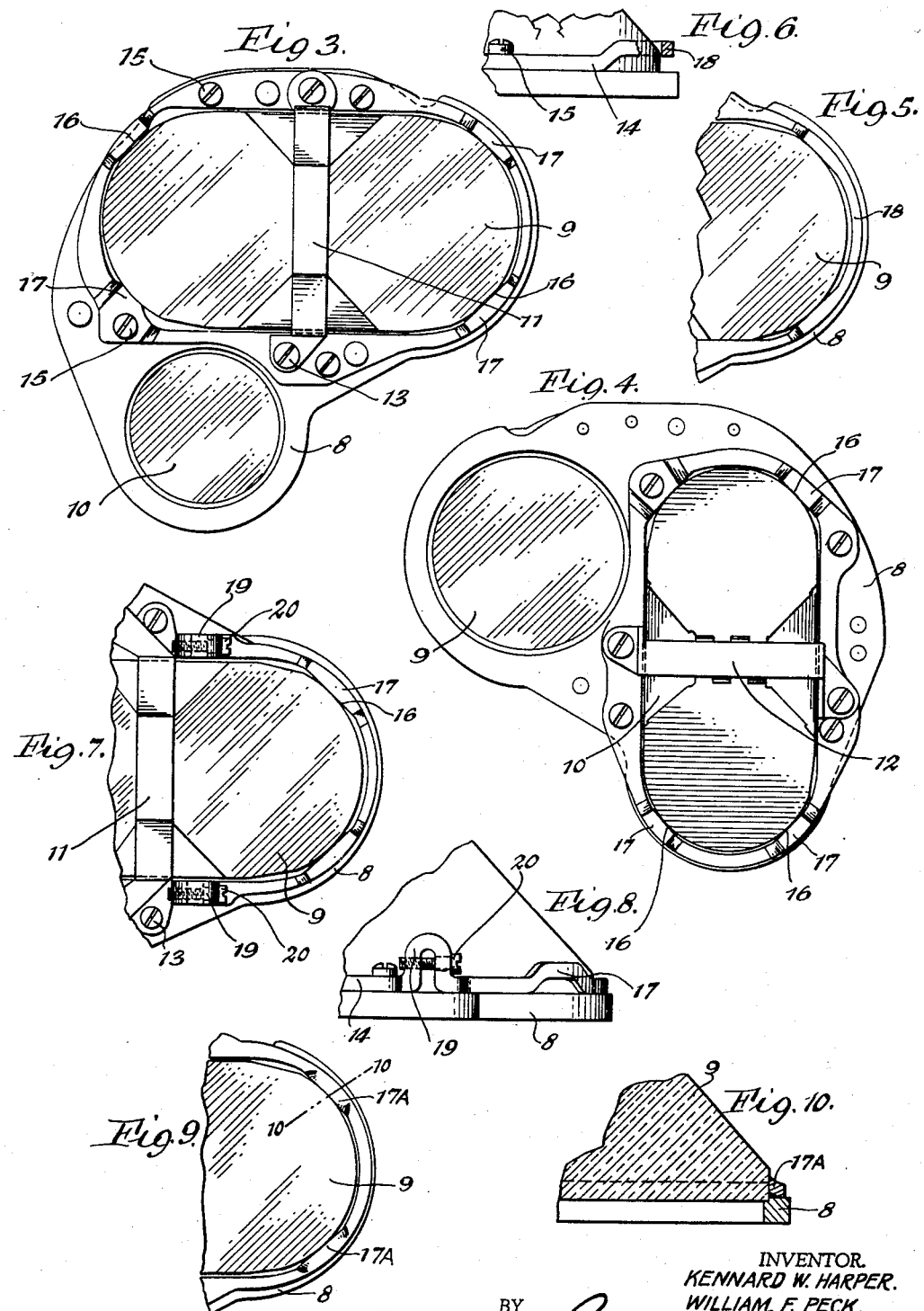
Nov. 11, 1947.  W. F. PECK ET AL  2,430,779
ATTACHMENT MEANS FOR BINOCULAR PRISMS AND THE LIKE
Filed March 22, 1944  2 Sheets-Sheet 2
INVENTOR.
KENNARD W. HARPER.
WILLIAM F. PECK.
BY Raymond A. Paquin
ATTORNEY Patented Nov. 11, 1947

2,430,779

UNITED STATES PATENT OFFICE 2,430,779

ATTACHMENT MEANS FOR BINOCULAR PRISMS AND THE LIKE

William F. Peck, Buffalo, and Kennard W. Harper, East Aurora, N. Y., assignors, by mesne assignments, to American Optical Company, Southbridge, Mass., a voluntary association Application March 22, 1944, Serial No. 527,569

3 Claims. (Cl. 88—33)

This invention relates to optical instruments and has particular reference to a new and improved means for supporting the prismatic elements thereof which means may be adjusted to the particular element and which will retain the element in position without any chipping or breaking thereof.

An object of the present invention is to provide a support for a prism for a prism binocular or other optical instrument which may be fitted to the particular prism.

Another object of the invention is to provide manually adjustable means for supporting a prism or the like which will substantially eliminate any chipping or breaking caused by the support.

Another object of the invention is to provide a simple, efficient and economical support for the prisms of a prism binocular or the like which may be fitted to the particular prism to compensate for any variations in manufacture thereof and which support is so formed as to prevent chipping or breaking of the edges of said prism.

Other objects and advantages of the invention will become apparent from the following description taken in connection with the accompanying drawings. It will be understood that many changes may be made in the details of construction and arrangement of parts without departing from the spirit of the invention as expressed in the accompanying claims. We, therefore, do not wish to be limited to the exact details of construction and arrangement of parts shown and described as the preferred embodiments have been given by way of illustration only.

Referring to the drawings:

Fig. 3 is a top plan view of the prism assembly shown in Figs. 1 and 2;

Fig. 4 is a bottom plan view of the prism assembly shown in Figs. 1, 2 and 3;

Fig. 5 is a fragmentary plan view of a modified form of the invention;

Fig. 6 is a side view of the modified form of the invention shown in Fig. 5;

Fig. 7 is a fragmentary plan view of the construction embodying the adjusting means in section;

Fig. 8 is a side view of the construction shown in Fig. 7;

Fig. 9 is a fragmentary plan view of a modified form of the invention; and

Fig. 10 is a sectional view taken on line 10—10 of Fig. 9.

Figure 1:
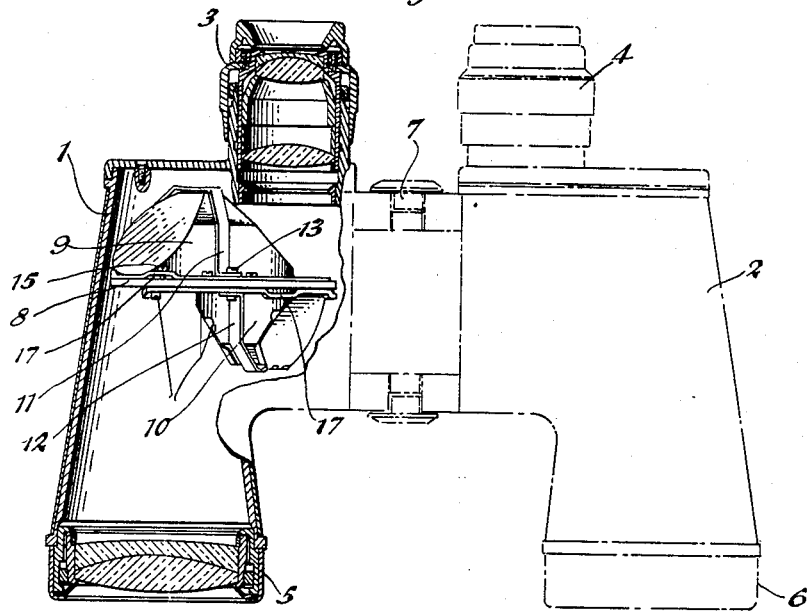
Fig. 1 is a plan view of a pair of binoculars embodying the invention and showing one of the telescopes thereof in section.
Figure 2:
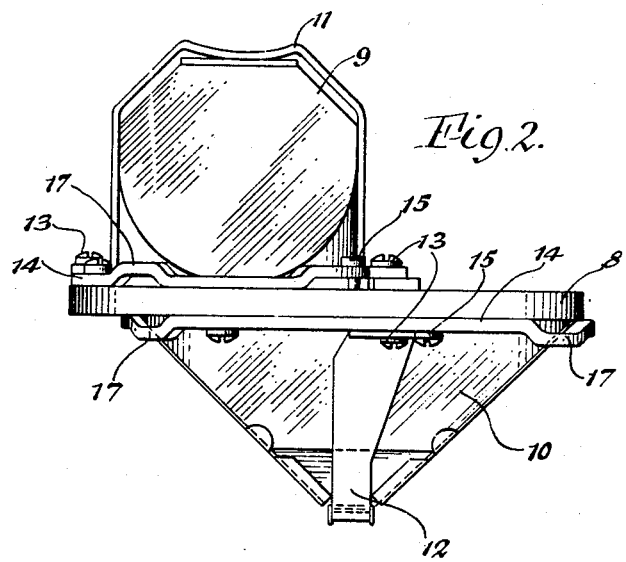
Fig. 2 is a side view of the prism assembly of the telescope shown in Fig. 1 on an enlarged scale.

In the past considerable chipping or breaking of the edges of the prism of prismatic optical instruments such as prism binoculars has been encountered because the support for the prism has engaged the periphery of the prism adjacent the edge thereof. This has caused considerable loss, consequently, increasing the cost of manufacture of such instruments.

We have found that by having the engagement between the support and prism at points spaced from the peripheral edge of the prism that this chipping or breaking is practically entirely eliminated due to the provision of a mass under the point of pressure of the support on the surface of the prism.

Also there has been considerable difficulty encountered in fitting the prism support or collar to the various prisms due to slight variations in the sizes of the prisms.

It is, therefore, the principal object of this invention to provide new and improved means for supporting the prisms which means may be easily and quickly adjusted to the size of the particular prism and also which will practically eliminate the chipping or breaking of the prism by the support.

Referring more particularly to the drawings, wherein the similar reference characters designate corresponding parts throughout the several views, the prism binocular shown embodying the invention comprises a pair of casings 1 and 2 each supporting an eyepiece 3 and 4 respectively and also each having an objective 5 and 6 respectively. The casings 1 and 2 are pivotally connected by means of the hinge member 7.

Each of the casings 1 and 2 contains a prism assembly as shown in the casing 1 in Fig. 1. This assembly comprises a prism support or plate 8 on the opposite sides of which are secured the Porro prisms 9 and 10 respectively.

Each of the prisms 9 and 10 is retained on the support 8 by means of the straps 11 and 12 which extend over the prisms and are secured adjacent their ends to the support 8 by means of the screws or the like 13.

In order to optically align the prisms 9 and 10 with each other and with the optical system of the eyepiece 3 and the optical system of the objective 5 the collar 14 is provided which surrounds the prism and which support is secured to be plate 8 by means of the screws 15 to retain the prisms in aligned position.

The collars 14 have a plurality of spaced bearing points 16 adapted to engage the prism at spaced points to retain the prism in aligned position without contact throughout the entire periphery of the prism to reduce the strain and stress on the prism to a minimum.

In the case where these bearing portions 16 engaged the prisms adjacent the peripheral edges thereof there is set up a strain adjacent the peripheral edge of the prism which often caused a chipping or breaking of the edge adjacent the point of contact between the prism and the bearing points on the prism collar.

In order to avoid this difficulty and to eliminate the breaking or chipping of the edge of the prism we have found by forming the collar 14 with raised or deflected portions 17 at the points of the bearing portions 16 that the bearing portions will engage the prism periphery at points spaced from the edge thereof thereby providing a mass of material under the point of pressure and thus preventing the chipping or breaking.

If desired, instead of forming the raised or deflected portions 17 only at the point of engagement the whole end portion 18 may be raised or deflected from the plane of the collar 14 as shown in Figs. 5 and 6.

Another method of forming these raised or deflected portions is to offset the bearing portions 17A as shown in Figs. 9 and 10 to cause the bearing portions to engage the prisms at points spaced from the peripheral edge thereof.

In order to allow the prism collar to be adjusted to the particular prism the collar may be provided with the integral bent portions 19 as shown in Figs. 7 and 8 in any desired number and each of which bent or looped portions 19 has a screw 20 extending through one portion of the loop and threaded into the opposite portion thereof whereby the collar 14 may be increased in size or decreased in size to fit a particular prism by adjusting the said screws 20.

From the foregoing it will be seen that we have provided simple, efficient and economical means for obtaining all of the objects and advantages of the invention.

Having described our invention, we claim:

1. In a device of the character described, the combination with a prism, having a base portion and end portions whose walls rise substantially perpendicularly from the base of the prism, of a prism support, and a continuous collar secured to said support and completely surrounding the prism for positioning the same on said support, said collar having spaced bearing portions for engaging said perpendicular walls at points spaced above the base thereof and having an integral loop extending upwardly from the base and provided with an operating member for contracting or expanding said loop to cause said collar to alter its enclosed area to accurately fit the base of the prism.

2. In a device of the character described, a generally flat collar adapted to be secured to a support for retaining an optical prism having a flat supporting base in adjusted position in face to face engagement with said support, said collar being endless for completely surrounding the base of said prism in generally spaced relation relative thereto, said collar having a plurality of spaced bearing portions thereon arranged to engage portions of said prism spaced from the plane of said flat base portion, said collar also having an integral loop extending upwardly from the plane of the collar and provided with adjustable means for contracting or expanding said loop to cause said bearing portions of the collar to accurately fit said prism and engage said prism at points spaced from the plane of said base, said bearing portions forming the sole means engaging said prism for preventing lateral movement of said prism relative to said support.

3. In a device of the character described, a generally flat metal collar adapted to be secured to a support for retaining an optical prism having a flat supporting base in face to face engagement with said support, said collar being endless so as to completely surround said base in generally spaced relation, said collar having a plurality of spaced bearing portions thereon arranged to engage portions of said prism spaced from the plane of said base, said collar having an integral loop bent upwardly from the plane of the collar and having an adjustment screw in engagement therewith for expanding or contracting the loop to cause said collar to alter the size of the area enclosed thereby so as to cause said bearing portions to accurately fit said prism and provide bearing points in engagement with wall portions of said prism spaced from the plane of said base, said bearing portions forming the sole means engaging said prism for preventing lateral movement of said prism relative to said support.

WILLIAM F. PECK.
KENNARD W. HARPER.

REFERENCES CITED

The following references are of record in the file of this patent:

UNITED STATES PATENTS

| Number | Name | Date |
|---|---|---|
| 2,306,853 | Wittig | Dec. 29, 1942 |
| 2,079,890 | Wollensak et al. | May 11, 1937 |
| 2,351,471 | Bailey | June 13, 1944 |
| 1,221,794 | Day | Apr. 3, 1917 |
| 1,599,862 | Baker | Sept. 14, 1926 |
| 1,285,775 | Mihalyi | Nov. 26, 1918 |
| 2,318,844 | Fassin | May 11, 1943 |
| 1,514,419 | Berggren | Nov. 4, 1924 |
| 2,386,394 | Grier | Oct. 9, 1945 |
| 1,383,058 | Atkin | June 28, 1921 |

FOREIGN PATENTS

| Number | Country | Date |
|---|---|---|
| 301,268 | Germany | Sept. 6, 1919 |
| 192,762 | Germany | Dec. 7, 1907 |
| 148,621 | Great Britain | July 26, 1920 |
| 365,754 | France | July 5, 1906 |